(12) United States Patent
Ilg et al.

(10) Patent No.: US 6,448,370 B2
(45) Date of Patent: Sep. 10, 2002

(54) TREATMENT OF POLYAMIDE WITH GAS PHASE OF ACID, ANHYDRIDE OR AMINE

(75) Inventors: Otto M. Ilg, Asheville; Harry Y. Hu, Arden; Scott R. Brank, Weaverville, all of NC (US)

(73) Assignee: BASF Corporation, Mt. Olive, NJ (US)

( * ) Notice: Subject to any disclaimer, the term of this patent is extended or adjusted under 35 U.S.C. 154(b) by 36 days.

(21) Appl. No.: 09/738,289

(22) Filed: Dec. 18, 2000

Related U.S. Application Data

(62) Division of application No. 09/613,042, filed on Jul. 10, 2000.

(51) Int. Cl.⁷ .................................................. C08F 6/00
(52) U.S. Cl. ........................................ 528/480; 428/364
(58) Field of Search ............................ 528/480; 428/364

(56) References Cited

U.S. PATENT DOCUMENTS

| 3,393,111 A | 7/1968 | Hofmann et al. ........... 156/305 |
| 3,653,801 A | 4/1972 | Aboul-Saad ................. 8/21 B |
| 3,749,698 A | 7/1973 | Lehmann et al. .......... 260/78 S |
| 3,846,381 A | 11/1974 | Kwok ....................... 260/78 R |
| 4,219,636 A | 8/1980 | Nielinger et al. ............ 528/318 |
| 4,379,773 A | 4/1983 | Danzik et al. ............... 264/184 |
| 5,270,437 A | 12/1993 | Marks ......................... 528/347 |

FOREIGN PATENT DOCUMENTS

| DE | 1 694 095 | 8/1971 | ........... C08G/41/02 |
| EP | 0 802 215 A1 | 10/1997 | ........... C08G/73/02 |
| JP | 96060541 | 3/1996 | |
| JP | 96231711 | 9/1996 | |

OTHER PUBLICATIONS

Abstract, 35808, Polyamide With reduced Amino End Groups and Process For Siad Polyamide.
Abstract, XP–002198063,.

Primary Examiner—Terressa M. Boykin
(74) Attorney, Agent, or Firm—Nixon & Vanderhye P.C.

(57) ABSTRACT

The end group content of polyamide in the solid state may be reduced by treating the polyamide with gas-phase acid, anhydride, or amine. Stain- or dye-resistant polyamide fibers can be made by reducing the number of amino end groups. Reduction in the number of carboxylic end groups reduces the rate of regeneration of starting monomers during extrusion.

10 Claims, No Drawings

TREATMENT OF POLYAMIDE WITH GAS PHASE OF ACID, ANHYDRIDE OR AMINE

This is a divisional of application Ser. No. 09/613,042, filed Jul. 10, 2000, now pending, the entire content of which is hereby incorporated by reference in this application.

FIELD OF THE INVENTION

The present invention relates to making stain- or dye-resistant polyamide carpet fibers by reducing the amino end group content of the polyamide. The present invention also relates to reducing the rate of monomer regeneration during extrusion of the polyamide by reducing the amount of end groups in the polyamide.

BACKGROUND OF THE INVENTION

As used herein, the term "fiber" includes fibers of extreme or indefinite length (i.e., filaments) and fibers of short length (i.e., staple fibers). The term "yarn" as used herein means a continuous strand of fibers.

The terms "stain" and "staining" as used herein with reference to polyamide fibers mean discoloration of such fibers caused by a chemical or physical attraction thereof with a substance such as, for example, food red. The terms "stain-resistant" and "stain resistance" as used herein with respect to polyamide fibers or carpets refers to the ability of the fiber or carpet to resist staining.

As used herein, "unmodified polyamide" refers to a typical commercially available polyamide with an AEG above 20 meq/kg that is known in the art such as, for example, nylon 6 or nylon 6,6.

Polyamide fibers are relatively inexpensive and offer a desirable combination of qualities such as durability, comfort, and ease of manufacture into a broad range of colors, patterns, and textures. As a result, polyamide fibers are widely used in the home and industry as carpets, drapery material, upholstery, and clothing. Carpets made from polyamide fibers are a popular floor covering for residential and commercial applications.

Polyamide fibers dye easily with acid dyes. Consequently, carpets made from polyamide fibers stain easily when exposed to natural or artificial acid dyes that exist in some foods, drinks, medicines, and other consumer products. The resulting stains cannot be easily removed under ordinary cleaning conditions. The severe staining of carpeting is a major problem for consumers. In fact, surveys show that more carpets are replaced because of staining than because of wear. Accordingly, it is desirable to provide polyamide fibers that resist common household stains, thereby increasing the life of the carpet.

One way of avoiding such staining is to topically apply to the surface of the polyamide filaments materials that function as stain blockers so as to prevent acid stains from permanently coloring the yarn. Topical treatments may be sulfonated materials that act as "colorless dyes" and bind the amine dye sites on the polyamide polymer. Sulfonated products for topical application to polyamide substrates are described in, for example, U.S. Pat. No. 4,963,409 to Liss et al., U.S. Pat. No. 5,223,340 to Moss, III et al., U.S. Pat. No. 5,316,850 to Sargent et al., and U.S. Pat. No. 5,436,049 to Hu. Topical treatments, however, tend to be costly and non-permanent (wash away with one or more shampoos).

Another way to make stain- or dye-resistant polyamide carpet fibers is to reduce the number of amino end groups in the polyamide yarn. Methods have been developed to reduce the amino end group content of polyamide fibers by adding amino end group blockers such as caprolactone and butyrolactone to the extruder during polymer extrusion. Blocking the end groups during polymer production greatly reduces the rate of polymerization, and the obtainable amino end group level would still be too high to provide meaningful stain resistance.

There remains a need for stain- or dye-resistant polyamide carpet fibers that overcome the above-discussed limitations, as well as a simpler and more economical process for producing the same.

Moreover, during extrusion, polyamides regenerate the starting monomers via the end groups in the melt. The regenerated monomers are deposited on the extruder die, which causes fuming and other processing problems. The regenerated monomers also show up in the finished products.

A need exists, therefore, for a method of reducing the rate of regeneration of starting monomers from polyamides during extrusion.

SUMMARY OF THE INVENTION

It is an object of the present invention to provide stain- or dye-resistant polyamide carpet fibers.

It is also an object of the present invention to produce a polyamide polymer that significantly slows down the rate of monomer regeneration during extrusion or remelting.

It has now been found that these objects may be achieved by reducing the number of end groups of solid state polyamide with an acid, anhydride, or amine gas.

The above and other objects, effects, features, and advantages of the present invention will become more apparent from the following detailed description of the preferred embodiments thereof.

DETAILED DESCRIPTION OF THE PREFERRED EMBODIMENTS

To promote an understanding of the principles of the present invention, descriptions of specific embodiments of the invention follow, and specific language is used to describe the same. It will nevertheless be understood that no limitation of the scope of the invention is intended by the use of this specific language and that alterations, modifications, equivalents, and further applications of the principles of the invention discussed are contemplated as would normally occur to one of ordinary skill in the art to which the invention pertains.

According to the present invention there is provided a method of processing solid-state polyamide comprising treating said polyamide with gas-phase acid, anhydride, or amine.

According to the present invention there is also provided a method of reducing the amino end group content of polyamide comprising treating said polyamide with gas-phase acid or anhydride. The polyamide treated in accordance with the present invention is particularly advantageous for solution-dyed fibers, greatly reducing the staining propensity of such carpets.

To reduce the number of amino end groups, solid state polyamide may be treated with an inert carrier gas such as nitrogen or argon containing acid or anhydride at temperatures above the boiling point of the acid or anhydride. The polyamide reacts in the solid state with the acid or anhydride in the gas phase at temperatures elevated above room temperature to reduce the number of amino end groups in the polyamide. Suitable acids include acetic acid, formic acid, and propionic acid. Acetic acid and formic acid are the preferred acids. Suitable anhydrides include acetic anhydride, maleic anhydride, and propionic anhydride. Acetic anhydride is the preferred anhydride.

Further according to the present invention there is provided a method of reducing the carboxylic end group content of polyamide comprising treating said polyamide with gas-phase amine. Reducing the carboxylic end group content reduces both the rate of monomer regeneration during extrusion and the amount of regenerated monomers in the finished products.

To reduce the number of carboxylic end groups, solid state polyamide may be treated with amines that are in the gas phase. More particularly, the polyamide is treated with a gas phase amine at temperatures above its boiling point such that the amine reacts with the polyamide to reduce the number of carboxylic end groups in the polyamide. Suitable amines include ammonia; methyl amine; dimethyl amine; ethyl amine; propylamine; 2-propylamine; butylamine; sec-butylamine; tert-butylamine; pentylamine; 2-pentylamine; 3-pentylamine; hexylamine; 2-hexylamine; 3-hexylamine, heptylamine; 2-heptylamine; 3-heptylamine; 4-heptylamine; octylamine; 2-octylamine; 3-octylamine; cyclopropylamine; cyclobutylamine; cyclohexylamine; cycloheptylamine; cyclooctylamine; 1,1,3,3-tetramethylbutylamine; diethylamine; diproylamine; dibytylamine;di-sec-butylamine; dipetylamine; N-ethylmethylamine; N-ethylpropylamine; N-ethylpropylamine; 1,2-diaminopropane; 1,3-diaminopropane; 1,2-diaminobutane; 1,3-diaminobutane; and 1,4-diaminobutane. Preferred amines are ammonia, methyl amine, and dimethyl amine.

Polyamides suitable for use in the invention are those that are generically known by the term "nylon" and that are long chain synthetic polymers containing amide (—CO—NH—) linkages along the main polymer chain. Examples of such polyamides include homopolyamides and copolyamides that are obtained by the polymerization of lactam or aminocaprionic acid, as well as a copolymerization product from mixtures of diamines and dicarboxylic acids or lactams.

Typical polyamides include nylon 6 [poly(epsilon-caprolactam)], nylon 6/6 (polyhexamethylene adipamide), nylon 6/9, nylon 6/10, nylon 6T, nylon 6/12, nylon 11, nylon 12, nylon 4/6, and copolymers or mixtures thereof. Polyamides can also be copolymers of nylon 6 or nylon 6/6 and a nylon salt obtained by reacting a dicarboxylic acid component such as terephthalic acid, isophthalic acid, adipic acid, or sebacic acid with a diamine such as hexamethylene diamine, methaxylene diamine, or 1,4-bisaminomethylcyclohexane. Preferred polyamides are nylon 6 and nylon 6/6. Nylon 6 is most preferred.

The polyamide treated according to the present invention may be formed into various articles. Non-limiting examples of such articles include fibers, yarns, textile fabrics, and the like.

Fibers may be formed by subjecting the modified polyamide of the present invention to any conventional fiber-forming process such as, for example, that disclosed in U.S. Pat. Nos. 4,983,448 to Karageorgiou and 5,487,860 to Kent et al., both of which are incorporated herein by reference.

Carpet may be made using conventional carpet-making techniques such as weaving or tufting the fibers into a backing material and binding the fibers to the backing with latex or other adhesives. The carpet may be cut-pile, berber, unlevel loop, level loop, or any other style according to the popular fashion. If desired, the carpet may be in the form of carpet tiles, with or without foam backing. By way of example, in the case of cut-pile carpeting, the yarn is tufted into a primary backing and cut to form cut-pile carpeting. The primary backing material may be woven or nonwoven jute, nylon, polyester, polypropylene, etc. The cut-pile carpeting is dyed to the desired shade. The primary backing is then coated with a suitable latex material such as a conventional styrene-butadiene ("SB") latex, vinylidene chloride polymer, or vinyl chloride-vinylidene chloride copolymers. It is common practice to use fillers such as calcium carbonate to reduce latex costs. The final step is to apply a secondary carpet backing to the latex-based adhesive. The secondary backing may be jute, polypropylene, nylon, polyester, etc. The carpet may be foam backed or not. The carpet of the present invention can be a variety of pile weights, pile heights, and styles. There is not currently believed to be any limitation on the carpet style.

Additionally, the fibers may be dyed or colored utilizing conventional fiber-coloring techniques. For example, the fibers of this invention may be subjected to an acid dye bath to achieve desired fiber coloration. Alternatively, the polyamide may be colored in the melt prior to fiber formation (i.e., solution dyed) using conventional pigments for such purpose.

The invention will be further described by reference to the following detailed examples. The examples are set forth by way of illustration and are not intended to limit the scope of the invention. All percentages are percentages by weight unless otherwise noted. In the following examples, the test procedures described below are used to measure the stated properties.

Amino End Group Content

The amino end group content is determined by dissolving about 2.0 g of the polymer in about 60 ml of a phenol-methanol mixture (68:32). This solution is titrated with about 0.20 normal HCl at about 25° C. by a potentiometric method, wherein the endpoint is determined by a steep potential increase.

Carboxylic End Group Content

The carboxylic end group content is determined by dissolving 0.30 g of the polymer in about 40 ml of benzyl alcohol at 180° C. The solution is titrated with about 0.03 normal t-butyl ammonium hydroxide at 80° C. to about 1000° C. by a potentiometric method, wherein the endpoint is determined by a steep potential increase.

EXAMPLE 1

About 22.0 grams of bright nylon chip (BS700F available from BASF Corporation, Mount Olive, N.J.) having an amino end group content of 36.5 meq/kg is placed in a reaction chamber. The reaction chamber is immersed in a silicone oil bath at about 165° C. A preheated nitrogen gas containing acetic acid vapor at about 165° C. enters the reaction chamber from the bottom. The excess gas escapes from the top of the chamber into a water trap. After about 16 hours of reaction, the chamber is purged with pure nitrogen at about 165° C. for about 4 hours. The content of amino end groups is 7.0 meq/kg.

EXAMPLE 2

About 22.0 grams of dull nylon chip (BS410F available from BASF Corporation, Mount Olive, N.J.) having an amino end group content of 29.7 meq/kg is placed in a reaction chamber. The reaction chamber is immersed in a silicone oil bath at about 165° C. A preheated nitrogen gas containing acetic acid vapor at about 165° C. enters the reaction chamber from the bottom. The excess gas escapes from the top of the chamber into a water trap. After about 24 hours of reaction, the chamber is purged with pure nitrogen at about 165° C. for about 4 hours. The content of amino end groups is 6.4 meq/kg.

EXAMPLE 3

About 22.0 grams of cationic nylon chip (BS600C available from BASF Corporation, Mount Olive, N.J.) having an amino end group content of 11.5 meq/kg is placed in a reaction chamber. The reaction chamber is immersed in a silicone oil bath at about 165° C. A preheated nitrogen gas containing acetic acid vapor at about 165° C. enters the reaction chamber from the bottom. The excess gas escapes from the top of the chamber into a water trap. After about 24 hours of reaction, the chamber is purged with pure nitrogen at about 165° C. for about 4 hours. The content of amino end groups is 6.1 meq/kg.

EXAMPLE 4

About 22.0 grams of bright nylon chip (BS700F available from BASF Corporation, Mount Olive, N.J.) having a carboxylic end group content of 59.0 meq/kg is placed in a reaction chamber. The reaction chamber is immersed in a silicone oil bath at about 165° C. A preheated ammonia gas at about 165° C. enters the reaction chamber from the bottom. The excess gas escapes from the top of the chamber into a water trap. After about 20 hours of reaction, the chamber is purged with pure nitrogen at about 165° C. for about 4 hours. The content of carboxylic end groups is 40.0 meq/kg.

EXAMPLE 5

Spinning of Bright 830 Denier/64 Filament Yarn

The nylon-6 polymer is extruded at 255–270° C. through a spinneret with a trilobal cross-section. The extruded filaments are quenched in air and taken up at speed of 300 m/min. The yarns are drawn on a drawing machine at a draw ration of 3.0. The chemical properties of polymers and yarns are summarized in the table 1.

TABLE 1

Chemical Properties of Polymers and Yarns

|  | Regular BS700F | | AEG-Blocked BS700F* | |
| --- | --- | --- | --- | --- |
|  | Polymer | Yarn | Polymer | Yarn |
| RV | 2.75 | 2.70 | 2.74 | 2.45 |
| AEG (meg/kg) | 37.4 | 34.0 | 7.7 | 8.7 |
| CEG (meg/kg) | 58 | 53 | 68 | 62 |
| Extractables (%) | 0.86 | 1.07 | 0.78 | 0.93 |
| Caproclatam (%) | 0.26 | 0.34 | 0.23 | 0.20 |

*AEG-Blocked BS700F was prepared from a scale-up of Example 1.

This example shows that AEG-blocked nylon has much less extractables and caprolactam increases than regular nylon.

EXAMPLE 6

Dyeing Carpet Yarns of Example 5 with Acid Dyes

Samples are dyed into Gray shade in beakers placed in an Atlas Lauder-Ometer at a volume equal to 20 times the weight of the sample. A stock solution is prepared using deionized water with 0.5% Irgasol SW (available from Ciba Specialty Chemicals, Greensboro, N.C.), 0.5 grams per liter of trisodium phosphate, and 0.25 grams per liter of Versene™ (Ethylenediaminetetraacetic acid, disolium salt; sequestering agent) from Millinckrodt Specialty chemicals Co., 0.027% Tectilon™ Blue 4R from Ciba. The dye bath pH is adjusted to 5.8 with acetic acid. Yarn samples in beakers are heated to 95° C. over 30 minutes and held at 95° C. for 30 minutes. After the yarns are rinsed with warm and cold water, the yarns are extracted and dried in a dryer. (Tectilon™ dyes are commercially available from Ciba Specialty Chemicals.)

EXAMPLE 7

Stain Test with C.I. Flood Red 17

A Sauer's Red Food Color (Color Index Food Red 17 or FD&C Red 40) from C.F. Sauer Company is prepared at 2.5 grams per liter concentration and adjusted to pH 2.8 with citric acid. Knitted tube sample is paced in a 10 to 1 bath ratio of Food Red 17 for 5 minutes at room temperature. then the sample is removed from the bath and squeezed slightly. After the sample is dried on screens for at leas 16 hours, it is rinsed under running faucet of cold water until no more than is removed. The sample is centrifuged and tumble dried. The test results are listed in Table 2.

TABLE 2

Comparison of AEG-Blocked Nylon with Regular Nylon in Stain Test

| | Discoloration (Delta E) | |
| --- | --- | --- |
| | Regular BS700F Yarn | AEG-Blocked BS700F Yarn |
| Food Red-17 | 18.17 | 6.46 |

While the invention has been described in connection with what is presently considered to be the most practical and preferred embodiment, it is to be understood that the invention is not to be limited to the disclosed embodiment, but on the contrary, is intended to cover various modifications and equivalents arrangements included within the spirit and scope of the appended claims.

What is claimed is:

1. A fiber formed from a polyamide treated in a solid state with a gas phase acid, anhydride or amine so that said polyamide has reduced end group content.

2. A stain- or dye-resistant polyamide carpet fiber comprising a polyamide treated in a solid state with a gas phase acid, anhydride or amine so that said polyamide has reduced end group content.

3. The fiber of claim 1 or 2, wherein the acid is selected from the group consisting of acetic acid, formic acid, and propionic acid.

4. The fiber of claim 1 or 2, wherein the acid is acetic acid.

5. The fiber of claim 1 or 2, wherein the anhydride is selected from the group consisting of acetic anhydride, propionic anhydride, and maleic anhydride.

6. The fiber of claim 1 or 2, wherein the anhydride is acetic anhydride.

7. The fiber of claim 1 or 2, wherein the amine is selected from the group consisting of ammonia; methyl amine; dimethyl amine; ethyl amine; propylamine; 2-propylamine; butylamine; sec-butylamine; tert-butylamine; pentylamine; 2-pentylamine; 3-pentylamine; hexylamine; 2-hexylamine; 3-hexylamine, heptylamine; 2-heptylamine; 3-heptylamine;

4-heptylamine; octylamine; 2-octylamine; 3-octylamine; cyclopropylamine; cyclobutylamine; cyclohexylamine; cycloheptylamine; cyclooctylamine; 1,1,3,3-tetramethylbutylamine; diethylamine; diproylamine;dibytylamine;di-sec-butylamine; dipetylamine; N-ethylmethylamine; N-ethylpropylamine; N-ethylpropylamine; 1,2-diaminopropane; 1,3-diaminopropane; 1,2-diaminobutane; 1,3-diaminobutane; and 1,4-diaminobutane.

8. The fiber of claim 1 or 2, wherein the amine is ammonia.

9. The fiber of claim 1 or 2, wherein the polyamide is treated with an inert carrier gas containing the acid, anhydride, or amine.

10. The fiber of claim 9, wherein the carrier gas is nitrogen or argon.

* * * * *